United States Patent [19]

Maurer

[11] Patent Number: 4,753,730

[45] Date of Patent: Jun. 28, 1988

[54] FILTER FOR SEPARATING SUBSTANCES HAVING LIPOPHILIC AND/OR OLEOPHILIC AND/OR APOLAR PROPERTIES FROM DIFFERENT LIQUIDS, GASES AND VAPORS

[75] Inventor: Günter Maurer, Neuenburg, Fed. Rep. of Germany

[73] Assignee: Rhodia AG, Freiburg, Fed. Rep. of Germany

[21] Appl. No.: 816,408

[22] Filed: Jan. 6, 1986

[30] Foreign Application Priority Data

Jan. 8, 1985 [DE] Fed. Rep. of Germany ....... 3500368

[51] Int. Cl.$^4$ ............................................ B01D 39/02
[52] U.S. Cl. ...................................... 210/483; 55/524; 55/528; 210/505; 210/508
[58] Field of Search ................... 210/483, 500.1, 502.1, 210/505, 507, 508; 55/524, 527–529

[56] References Cited

U.S. PATENT DOCUMENTS 4,104,170  8/1978  Nedza ................................. 210/505

FOREIGN PATENT DOCUMENTS 0084711  8/1983  European Pat. Off. .
1786089  8/1965  Fed. Rep. of Germany .

Primary Examiner—Ivars Cintins
Attorney, Agent, or Firm—Stevens, Davis, Miller & Mosher

[57] ABSTRACT

A filter for separating substances having lipophilic and/or oleophilic and/or apolar properties, such as fats, oils, substituted or unsubstituted hydrocarbons, from different liquids, gases and vapors, such as water, (moist) air and water vapor, employing polyolefin fibers and/or filaments which have a diameter of 0.1 to 10 82 m, and preferably 0.5 to 2 $\mu$m, as filter material. The filter material is present in the form of bands or strands which are of finite or infinite length, and which are formed from webs, waddings or other sheet-like structures made of such fine fibers and/or filaments and which are arranged with respect to each other in such a way that free openings and passages are in between them. The filter material perferably consists of polyethylene and/or polypropylene fibers and/or filaments.

10 Claims, 1 Drawing Sheet

U.S. Patent  Jun. 28, 1988  4,753,730
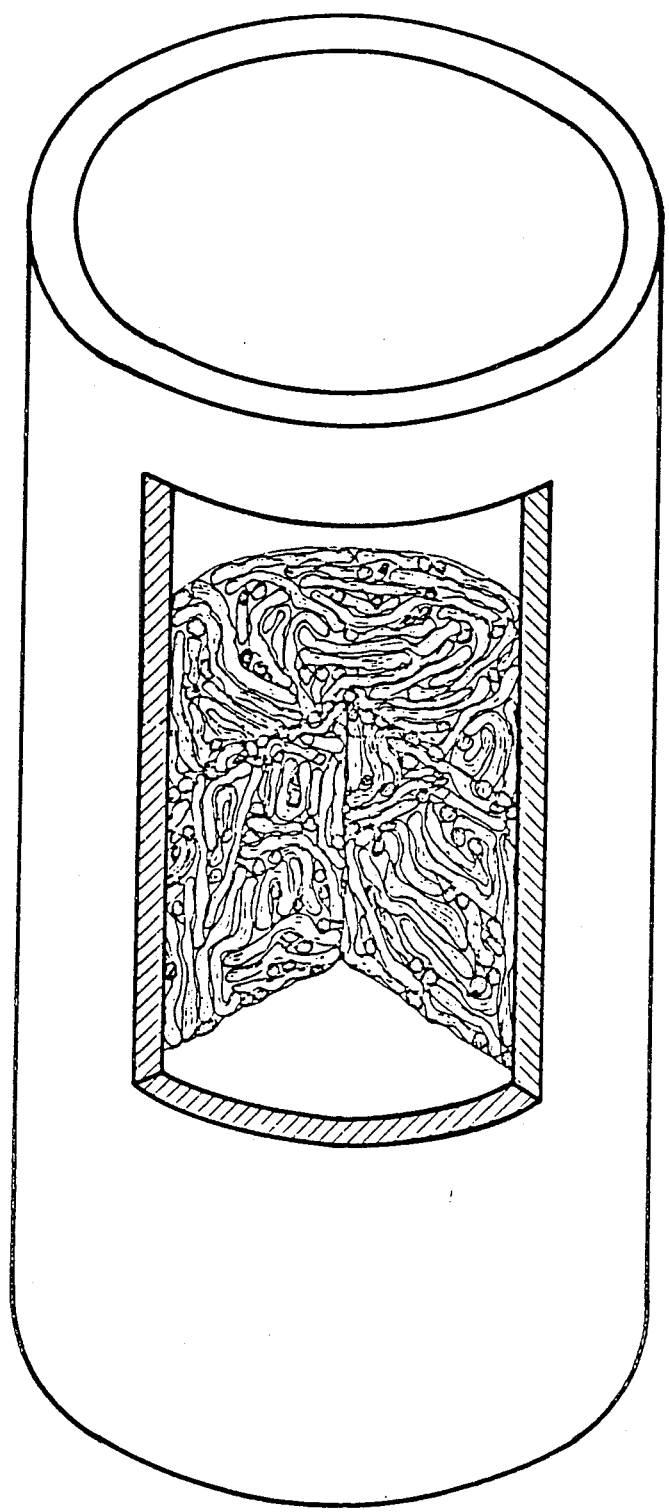

FILTER FOR SEPARATING SUBSTANCES HAVING LIPOPHILIC AND/OR OLEOPHILIC AND/OR APOLAR PROPERTIES FROM DIFFERENT LIQUIDS, GASES AND VAPORS

This invention relates to a filter for separating substances having lipophilic and/or oleophilic and/or apolar properties from different liquids, gases and vapors, with polyolefin fibers and/or filaments as filter material, the fibers and filaments having a diameter of from 0.1 to 10 μm.

The article "Development and Commercialization of the Melt Blowing Process for Manufacture of Fine Fibered Webs" in *Formed Fabrics Industrie*, December 1974, pages 39–50, discloses the use of polyolefin fiber and/or filament webs produced by blow-spinning and having a fiber and filament diameter of less than 10 μm for filtration purposes, for example, for filtering oils.

However, if used as filters for separating off, for example, oils or fats from, for example, water or air, filters including such webs or, indeed, waddings and paper-like sheet-like structures made of the previously described fine polyolefin fibers and/or filaments as filter materials, having the following disadvantages:

depending on the fineness, i.e., diameter, of the fibers and filaments and the density of the webs, waddings, etc., flow is possible through them only with the application of additional pressure over and above the static pressure;

the filter material becomes blocked very rapidly, or plugs up within a relatively short time, i.e., the operating lives of such filters are very short.

It is, therefore, an object of the present invention to provide a filter for separating fats, oils, hydrocarbons, substituted hydrocarbons and the like, that is to say, lipophilic and/or oleophilic and/or apolar substances, from different liquids, such as water, different gases, such as (moist) air, and different vapors, such as water vapor, through which the stated liquids, gases or vapors can flow without employment of additional pressure, and which has a considerably longer operating life than the known filters.

This object is achieved in the base of a filter of the type mentioned above for separating substances having lipophilic and/or oleophilic and/or apolar properties from different liquids, gases and vapors by means of the features specified below. Especially advantageous embodiments of the filter, according to the present invention, are also mentioned below.

A preferred range of diameter for the fibers and filaments (within the broader range of from 0.1 to 10 μm mentioned above) is from 0.5 to 2 μm. The advantage of this narrower range is that it serves to increase the active filter surface area.

The advantage of employing the polyethylene and/or polypropylene fibers and/or filaments mentioned below is that, of all the polyolefins, polyethylene and polypropylene are most readily accessible and are relatively inexpensive. Moreover, polyethylene and polypropylene are most suitable for processing by blow-spinning to give webs composed of very fine fibers and/or filaments.

By the addition of substances having adsorbent and/or absorbent properties, for example, activated carbon powder, it is possible to separate not only substances having lipophilic and/or oleophilic and/or apolar properties from different liquids, gases and vapors, but also other substances, for example, those having polar properties.

For the purposes of the present invention, suitable bands or strands employed as filter material may have any desired cross-section; they may thus, for example, have a round, oval, rectangular, square or triangular cross-section, but other shapes of cross-section may also be imparted to the bands or strands of filter material.

The bands or strands may be of finite length, and thus be present, for example, in lengths of 5 to 15 cm. On the other hand, they may also be present in continuous form.

In addition, the bands or strands may be textured, for example, embossed, along their length and/or be twisted about their longitudinal axis.

Finally, the bands or strands may be compressed to a certain degree and hence have various densities.

Substances having lipophilic and/or oleophilic and/or apolar properties are, for example, fats, oils, such as mineral oils or silicone oils, hydrocarbons, substituted hydrocarbons, such as chlorinated or fluorinated hydrocarbons, and the like, or mixtures thereof.

The different liquids, gases and vapors may also be liquid, gas and vapor mixtures.

For the purposes of this invention, suitable substances having adsorbent and/or absorbent properties are, for example, activated carbon, preferably in powder form, silica gels, natural and artificial silicates, ion-exchangers, complexing agents, molecular sieves, and also metal oxides, oxide hydrates and hydroxides, for example, of aluminum, iron, calcium, magnesium, silicon and titanium, and the like.

The filter, according to the present invention, functions primarily in accordance with the flow-through principle.

The different liquids, such as water, gases, such as air, and vapors, such as water vapor, pass relatively easily through the free openings and passages between the bands or strands, but are nonetheless whirled therein, which additionally favors the removal of the substances having lipophilic and/or oleophilic and/or apolar properties by the bands or strands which are made of the polyolefin fibers and/or filaments and which, by virtue of their molecular structure, are highly capable of binding such substances of similar structure.

The absorption capacity of the filter, according to the present invention, for the substances having lipophilic and/or oleophilic and/or apolar properties may be affected by:

the fineness, that is to say, the diameter, of the polyolefin fibers and filaments;

the packing density of the bands or strands within the filter;

the spatial arrangement of the bands or strands within the filter;

the cross-sectional area of the bands or strands; and/or the density of the bands or strands themselves.

The invention is illustrated in still more detail by reference to the following example:

EXAMPLE

Polypropylene, having a melt flow index at 230° C./2.16 kg of 13 g/10 min, a density at 23° C. of 0.902 g/cm$^3$, and a melting range of 165° to 170° C., was melted and spun (blow-spun) by means of a spinning head, similar to that described in German Patent Specification No. 2,550,463, into fibers and filaments which had an average diameter of 1.0 μm and a specific surface area of 4.4 m²/g.

The fibers and filaments were laid onto a rotating drum to form a spun-band, web or fleece.

The spun-band thus obtained had a weight per unit area of 220 g/m², a thickness of 3 mm, and a width of 30 cm.

In this form, the material has only limited usefulness for filtration purposes.

This spun-band was cut by means of a cutting system, composed of plane ground circular knives, into bands having a rectangular cross-section and a width of 2.5 mm, the gaps formed by the circular knives arranged in offset position on two opposite shafts, ensuring the shaping. During the cutting, the bands were compressed to an average thickness of 1.5 mm. By traversing the spun-band or web, it was possible to obtain bands having a length of about 15 cm.

These loose, that is, unattached, pieces of bands, taken from the cutting system, were introduced into a cylindrical plexiglass tube having an internal diameter of 200 mm and a length of 150 cm between two metal sieves having honeycomb-shaped holes and an open area (free access area) of 70%, and were compressed by moving the metal sieves toward each other to a packing density of 43.4 kg/m³. The bands were arranged randomly within the plexiglass tube, so that free openings and passages existed in between them. This filter structure is shown in the accompanying drawing.

Water was passed through the filter, thus forming, under a static prepressure of 0.6 bar (=60.000 Pa), the resulting flow rate per m² of access area being 10.500 liters of water/h. Mineral oil SAE 30 was then added to this water in a volumetric ratio of water to oil of 100:1. The oil-containing water passed through the filter until the filter was saturated with oil without increasing pressure, the oil being taken up by the bands of the filter in an amount of up to 7.3 times the original weight of these bands, and hence being separated from the water.

The present invention has the following advantages: without employment of pressure additional to the static pressure, it is possible for liquids, gases and vapors which contain lipophilic and/or oleophilic and/or apolar substances to readily flow through the filter. Moreover, the filter, according to this invention, has a considerably longer operating life than previously known filters.

What is claimed is:

1. A filter for separating substances having lipophilic and/or oleophilic and/or apolar properties from different liquids, gases and vapors, comprising polyolefin fibers and/or filaments as filter material, the fibers and/or filaments having a diameter of about 0.1 to 10 μm, and wherein the filter material is present in the form of a plurality of loose bands or strands which:
   are of finite length or which are continuous;
   are formed from webs, waddings, or similar sheet-like structures of such fibers and/or filaments; and
   are randomly arranged relative to each other, such that there are free openings and channels in between them.

2. The filter according to claim 1, wherein the fibers and/or filaments have a diameter of about 0.5 to 2 μm.

3. The filter according to claim 1 or claim 2, wherein the filter material consists essentially of polyethylene and/or polypropylene fibers and/or filaments.

4. The filter according to claim 1 or claim 2, wherein substances having adsorbent and/or absorbent properties are incorporated on and/or in the bands or strands.

5. The filter according to claim 4, wherein said incorporated substances are selected from the group consisting of activated carbon, silica gels, natural and artificial silicates, ion-exchangers, complexing agents, molecular sieves, and metal oxides, oxide hydrates and hydroxides of a metal selected from the group consisting of aluminum, iron, calcium, magnesium, silicon and titanium.

6. The filter according to claim 1, wherein said bands or strands have a rectangular cross-section.

7. The filter according to claim 6, wherein said bands or strands have a width of about 2.5 mm.

8. The filter according to claim 6, wherein said bands or strands have a thickness of about 1.5 mm.

9. The filter according to claim 1, wherein said bands or strands have a length from about 5 to 15 cm.

10. The filter according to claim 1, wherein the fibers and/or filaments are spun fibers and/or spun filaments.

* * * * *

UNITED STATES PATENT AND TRADEMARK OFFICE
CERTIFICATE OF CORRECTION

PATENT NO. : 4,753,730
DATED : June 28, 1988
INVENTOR(S) : Gunter MAURER

It is certified that error appears in the above-identified patent and that said Letters Patent is hereby corrected as shown below:

Title page:

In the Abstract, lines 6 and 7 change "...which have a diameter of 0.1 to 10 82 m, and preferably..." to --...which have a diameter of 0.1 to 10 μm, and preferably...--.

In the Specification, column 1, line 44 change "...in the base of a filter of the..." to --...in the case of a filter of the...--.

Signed and Sealed this

Thirteenth Day of December, 1988

Attest:

DONALD J. QUIGG

*Attesting Officer*  *Commissioner of Patents and Trademarks*